E. C. SMITH.
BELT FOR TRANSMISSION OF POWER.
APPLICATION FILED OCT. 4, 1917.

1,275,621.

Patented Aug. 13, 1918.

Inventor
Etta Clifton Smith
By D. A. Gourick
Attorney

UNITED STATES PATENT OFFICE.

ELTA CLIFTON SMITH, OF SPRINGFIELD, MISSOURI, ASSIGNOR, BY DIRECT AND MESNE ASSIGNMENTS, OF ONE-HALF TO FREDERICK BURTON COOK AND MARTIN WILLIAM RYAN AND ONE-HALF TO ARTHUR CARSON LUCAS AND EVERETT VELLESLIE HORNER, ALL OF SPRINGFIELD, MISSOURI.

BELT FOR TRANSMISSION OF POWER.

1,275,621. Specification of Letters Patent. Patented Aug. 13, 1918.

Application filed October 4, 1917. Serial No. 194,710.

*To all whom it may concern:*

Be it known that I, ELTA CLIFTON SMITH, a citizen of the United States, residing at Springfield, in the county of Greene and State of Missouri, have invented certain new and useful Improvements in Belts for Transmission of Power, of which the following is a specification.

My invention relates to belts for the transmission of power, particularly to those of the laminated type, and has for its object the provision of a flat, continuous belt formed of layers of suitable material, preferably leather, so united by longitudinally arranged lacing thongs of the same material that longitudinal stretching and curling of the edges will be prevented and whereby the danger of warping from contact with water or grease will be reduced to a minimum, thereby permitting its satisfactory use upon pulleys unprovided with flanges.

An important object is the provision of a belt of this character constructed without the use of cementing material and also free from any metallic fastenings whereby it may be used in connection with electrical devices without any possibility of short circuiting through the belt.

With these and other objects in view such as simplicity, cheapness, durability and the general improvement of the art, my invention consists in the novel construction to be hereinafter more fully described and claimed and illustrated in the accompanying drawing in which:

Figure 1:
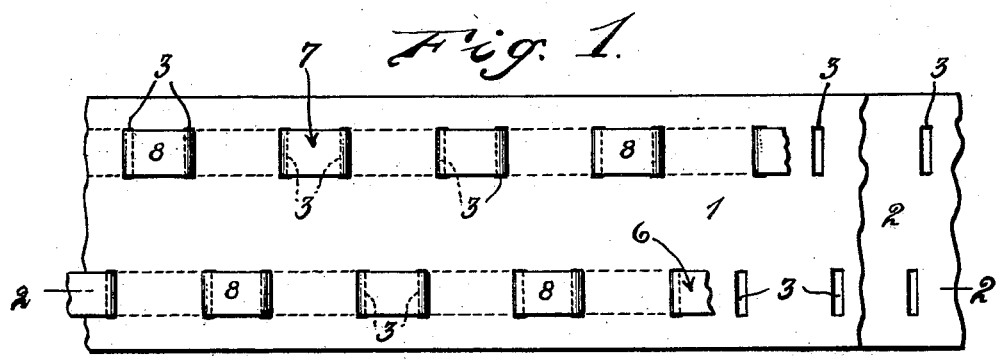
Figure 1 is a plan view of a portion of my improved belt.
Figure 2:
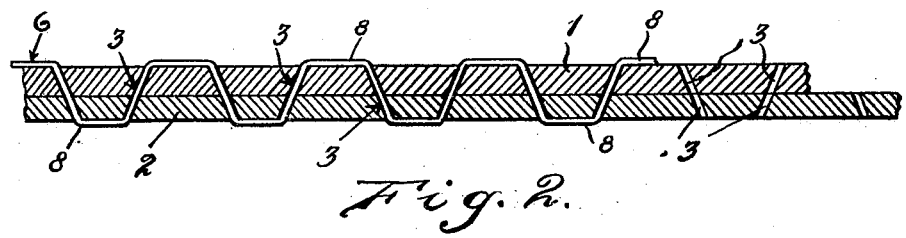
Fig. 2 is a longitudinal section therethrough.

Referring more particularly to the drawing, the numeral 1 designates the outer layer which may be conveniently formed of split leather. The inner layer or lining is designated by the numeral 2 and is preferably formed of chrome leather. Only two layers are shown and described though it will be understood that any desired number of layers may be employed in order to form belts of different sizes and strengths for different purposes.

The layers 1 and 2 are provided with longitudinal rows of openings or perforations, the openings in one row being out of alinement with those in the other row for a purpose to be described. As shown in the drawing the openings in each row are inclined toward each other so as to be arranged in converging pairs, though it will be understood that they may extend at right angles through the layers, if desired, and be parallel with one another in every respect.

Figure 3:
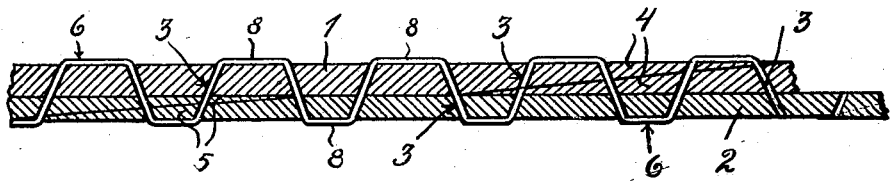
Fig. 3 is a view similar to Fig. 2 showing the connection of the ends of the layers to make a continuous belt.

The layers 1 and 2 have their respective ends 4 and 5 wedge shaped and brought together as shown in Fig. 3 in order to form a continuous belt structure.

In order that the layers may be secured together without the use of machine stitching, cement or metallic fasteners, I employ two thongs 6 and 7, preferably of leather, threaded through the openings 3 in each row, as clearly shown, and having their respective ends secured as by overlapping them. It will be noted that the openings 3 are so arranged that the serpentine coils of each thong will be in staggered relation to the coils or bends of the other, thereby evenly distributing all strain and making the belt uniform in strength throughout the entire length. The thongs will of course project beyond the outer and inner faces of the outer and inner layers thereby increasing the tractive power of the belt.

From the foregoing description taken in conjunction with the drawing it will be apparent that I have thus provided a belt which will be uniform in construction and strength throughout, which is not liable to have its layers become separated and which has the minimum tendency to stretch or curl.

Having thus described my invention, I claim:

1. A belt comprising a plurality of layers provided with longitudinal rows of openings, the openings in one row being out of transverse alinement with the openings in the other row, and thongs serpentinely threaded through the openings in each row.

2. A belt comprising a plurality of layers provided with longitudinal rows of transversely extending openings therethrough, the openings in one row being out of alinement with the openings in the other row, and thongs serpentinely threaded through the openings in each row, the convolutions of said thongs being in staggered relation.

3. A belt comprising a plurality of layers in superposed relation, said superposed layers being provided with longitudinal rows of transversely arranged openings extending diagonally therethrough, and thongs serpentinely threaded through the openings in each row.

4. A belt comprising a plurality of superposed layers provided with longitudinal spaced rows of transverse openings extending transversely through the layers, and a thong laced through the openings in each row, the convolutions of one thong alternating with those of the other thong, said thongs lying in planes parallel with the edges of said layers, and the convolutions of each thong being free from one another.

In testimony whereof I hereto affix my signature.

ELTA CLIFTON SMITH.

Copies of this patent may be obtained for five cents each, by addressing the "Commissioner of Patents, Washington, D. C."